US006267920B1

(12) United States Patent
Arakawa et al.

(10) Patent No.: US 6,267,920 B1
(45) **Date of Patent: *Jul. 31, 2001**

(54) HYDROSTATIC COMPRESSION METHOD FOR PRODUCING A FANCY LOG FROM A PRIMARY WOOD

(75) Inventors: Tamio Arakawa; Akihiko Ito; Toshio Muraki; Masako Sakurai, all of Aichi (JP)

(73) Assignee: Mywood Corporation, Aichi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/929,651

(22) Filed: Sep. 16, 1997

(30) Foreign Application Priority Data

Oct. 4, 1996 (JP) .................................................. 8-283181
Mar. 14, 1997 (JP) .................................................. 9-060365
Apr. 23, 1997 (JP) .................................................. 9-106027

(51) Int. Cl.[7] .......................... B29C 43/10; B29C 35/04; B29C 35/16; B29C 71/02

(52) U.S. Cl. .......................... 264/570; 264/134; 264/234; 264/236; 264/322; 264/345; 264/346; 264/347; 264/348; 264/235; 144/380; 425/384; 425/405.1; 425/405.2

(58) Field of Search .................................... 264/322, 345, 264/346, 348, 570, 234, 235, 236, 347, 134; 425/405.1, 405.2, 384; 144/380

(56) References Cited

U.S. PATENT DOCUMENTS 3,477,364 * 11/1969 Satchell et al. ...................... 264/570
4,264,556 * 4/1981 Kumar et al. ........................ 144/361
4,606,388 * 8/1986 Favot .................................. 144/361
4,942,081 * 7/1990 Reiniger .............................. 428/218
5,334,445 * 8/1994 Ruyter et al. ........................ 428/284
5,451,361 * 9/1995 Ruyter et al. ........................ 264/322
5,652,023 * 7/1997 Bergervoet et al. ................ 427/297
5,747,177 * 5/1998 Torimoto et al. ................ 428/537.1

FOREIGN PATENT DOCUMENTS 3-231802 10/1991 (JP) .
3-295605 12/1991 (JP) .
9-76206 3/1997 (JP) .

OTHER PUBLICATIONS

A.J. Stamm, "Wood and Cellulose Science", Densified Wood, Jul. 1964, pp. 343–358.

* cited by examiner

*Primary Examiner*—Jan H. Silbaugh
*Assistant Examiner*—Michael I. Poe
(74) *Attorney, Agent, or Firm*—Wenderoth, Lind & Ponack, L.L.P.

(57) ABSTRACT

A hydrostatic compression method for producing a fancy log with a decorative and complicated external appearance from a primary wood. In the method, a primary wood having a water content adjusted in the range of 10–80 wt % is brought into a softened state, then the softened wood is compressed with hydrostatic pressure by means of liquid as pressurizing medium. Next, the compressed wood is treated with a fixation means to fix the compressed state. The fixation means can be a shaping jig, a mold, heating in a particular temperature range conducted while constraining the volume relation of compressed wood, cooling down below the softening point of the wood while under pressure, compact-packing together with hard particles into a vessel followed by heating, or a primary wood is chemically treated to form a localized wood-plastics composite before applying hydrostatic compression.

19 Claims, 4 Drawing Sheets

HYDROSTATIC COMPRESSION METHOD FOR PRODUCING A FANCY LOG FROM A PRIMARY WOOD

BACKGROUND OF THE INVENTION

1. Field of the Invention

This invention relates to a novel forming method for wood to obtain a unique ligneous material having high hardness, a beautiful grain and an excellent external appearance. More specifically, this invention relates to a compression forming method for shaping a wood by using hydrostatic force of a pressurizing liquid.

This invention can be applied to a manufacturing process to economically produce, for example, a shaped ligneous material with improved surface hardness, or a sawn lumber with a beautiful grain and improved physical properties, or a so-called "fancy log" with decorative and complicated external appearance, without using a mold. The application of this invention is, however, not necessarily limited to these, and this invention is useful in other ways of application in industry.

2. Description of the Prior Art

Forming method, so-called "densification" for soft wood such as cedar, to improve the physical properties as well as its shape is known in the art. In the densification, a primary wood is heated in order to bring it into softened state, then compressed by using a mold to form it into a desired shape to obtain a shaped ligneous material with high surface hardness. The word "primary wood" means a log, lumber, or any other form of wood used as raw material which is to be treated in the process of this invention.

For example, a forming method has been practiced commercially, in which a timber of cedar is heated by hot water or saturated steam to around 100° C. to bring the wood into a plasticized state. It is then compressed with the solid surfaces of a mold to form a pillar having polygonal cross section. Next, the shape is stabilized by cooling or drying the compressed wood and the wood is kept in the mold for many hours.

Also, another forming method is known in the art, in which a primary wood is plasticized by means of steam at a high temperature and pressure. Next, the plasticized wood is loaded between a pair of mold plates and compressed while steam under high or atmospheric pressure is applied. Then its shape is stabilized by leaving it in the mold under an atmosphere of high temperature steam for period of hours.

In either case, a shaped ligneous material having a higher density and a higher hardness in comparison with a primary wood is obtained. It should be noted that compression of wood by mold surfaces, when carried out to excess, can cause damage to the wood tissues resulting in local deterioration of hardness. Typically, however, compression of wood has been conducted almost exclusively by using the solid surfaces of a mold.

Moreover, as described above, it is absolutely necessary for a compressed ligneous material to be held in a mold closed under mechanical force for many hours, in order to stabilize the shape of the compressed ligneous material.

Up to this time, a few methods have been practiced commercially with the above purposes in mind. For example, cooling water is supplied through an inner path of the mold to cool down the temperature of compressed wood below the softening point, for a period of time. Then, the shaped material is taken out of a mold. In another way, after compressing a softened wood, the mold holding the compressed wood is treated in steam at around 180° C. for a period of time, then the shaped material is cooled and removed of a mold.

Without said treatment by high temperature steam, the stress generated by the forming is retained in a compressed wood and will cause relaxation of compressed state of the wood when the shaped ligneous material is heated to a temperature above its softening point. That means, the volume of a compressed wood is recovered up to nearly the original volume, (i.e. this is so-called volume relaxation), and also a rebound in its shape takes place until it approaches to original shape.

It is evident from the above discussion that a long residence time in the mold is required for wood in the conventional densification methods, which will inevitably push up the production cost of shaped articles since manufacturing cost of a mold is generally high.

For the purpose of reducing a residence time in a mold, a method was proposed in an earlier development. That is, the use of a jig with sufficient strength to withstand a volume relaxation (called a shaping jig hereinafter). The jig is usually installed inside the mold, and softened wood is compressed inside the jig. When compression is over, the jig parts are firmly mechanically connected together along their edge lines, and the jig holding the compressed wood inside is immediately removed from the mold.

This method may be useful for manufacturing smaller shaped articles. But it can not be practical for production of large material, such as lumber for building a frame house, since rather thick, heavy metal walls are need for the construction of the jig.

In practice, after all, there has been almost no method, except use of molds or jigs, useful for the compression of wood and for the fixation of the resulting compressed structure or state. At the same time, no method has been proposed so far to utilize hydrostatic pressure for direct compression of plasticized wood in a liquid.

SUMMARY OF THE INVENTION

The object of the present invention is to provide a method for obtaining a shaped ligneous material with improved hardness, density, without utilizing a mold.

A further object of this invention is to provide a method for fixing the compressed state or internal compressed structure of densified wood obtained by aforementioned forming to prevent it from volume relaxation or dimensional change during its use.

A still further object is to provide a shaped ligneous material produced by employing the above method having a decorative external appearance and beautiful internal grains which become visible when sawn. Other objects and advantages of the present invention will become apparent from the detailed description to follow taken in conjunction with the appended claims.

According to the first invention, a primary wood, such as a log, sawn lumber and the like, is brought into softened state by heating it above its softening temperature by means of, for example, hot water or steam at high temperature. Then, the softened wood is compressed to a desired compression ratio, for example, roughly 50% by cross-sectional ratio, to shape a densified wood by means of hydrostatic pressure of a pressurizing liquid in replacement of a mold used in conventional technologies. By an effect of the hydrostatic compression, the physical properties, such as density and surface hardness, of a primary wood, in the form of log, column, plank, square lumber and the like, increase with the decrease of its volume, and a densified ligneous material with improved physical properties is obtained.

Features of hydrostatic forming method of this invention will be explained as follows, taking a log as an example of a primary wood. At the moment when the pressure of pressurizing liquid exceeds the yielding stress of the softened log, compression by hydrostatic pressure starts. Generally, the compression is considered to begin at the surface layer part of a log (i.e., sap wood) which is softer than the heart wood. At the first stage of compression where the sap wood is compressed, a log is compressed by isostatic force exerted by pressurizing liquid in a direction perpendicular to annual rings. Consequently, the diameter of the log decreases due to collapse of cells in the early-growing part (i.e., early wood). But, the late-growing part of a log (i.e., late wood) which cells are stronger in mechanical strength due to small cell size and thick cell walls, tends to resist deformation by compression.

Therefore, the length in the tangential direction of each tree ring (i.e. the contour length), is hardly changed by compression. As the result, individual annual rings display a wave-like pattern at the surface layer part and a complicated undulation, reflecting the internal deformation, appears on the side surface of the compressed log. At the stage of this surface layer compression, a log having a decorative appearance of a so-called "fancy log" is obtained as the shaped ligneous material.

At the later stage of compression, the surface layer part, which has already been mechanically strengthened by preceding compression, is forced to cave in towards the softened heart wood. As a consequence, the cross section shows the highly deformed annual rings consisting of non-circular closed curves with many large bends. The highly compressed log is in itself useful due to its decorative appearance. It is also a useful starting material for production of boards, pillars and other sawn material with beautiful grains.

On releasing the pressure of pressurizing liquid at the same temperature used during hydrostatic compression, a volume relaxation of the compressed log takes place immediately, and the log recovers the volume by a recovery ratio of about 90% . However, a densified wood obtained according to the compression forming of the present invention has tendencies to allow a lower incidence of cracking by drying and to reduce the size of cracking, though a substantial expansion by volume relaxation is inevitable.

That is to say, one of the advantages of this invention is that a densified ligneous material in the form of logs obtained as mentioned above does not need a processing called karfing for aging, though a timber usually needs karfing to prevent it from cracking, by drying before it is normally used without compression.

To bring a primary wood into softened state, it is necessary to heat it above the softening temperature of lignin and hemicellulose. The softening point of a primary wood is dependent on the water content of the wood, and is generally around 100° C., if a wood contains moisture above its fiber saturation point. The softening temperature rises with a decrease in moisture content below the fiber saturation point. The moisture content quoted above means the percentage by weight of total water existing in the ligneous tissue versus total weight of the wood. Total water comprises free water existing freely in the cell cavity and combined water bonded to components of ligneous material by a hydrogen bond and so forth.

Hydrostatic compression becomes substantially difficult if the free water content is exceedingly high, as the space in vascular tissue and cells is then almost filled with free water. Hydrostatic compression is also difficult if water content is so low as to make a primary wood extremely dry. Many cracks develop on the surface of wood where the pressurizing liquid breaks into the wood. Further, the aforementioned rise of the softening point of wood along with drying causes inconvenience for softening the wood. For these reasons, the water content of a primary wood is desirable in the range between 10% and 80% by weight.

Furthermore, in the aforementioned forming method, softening a primary wood and compressing the softened wood by hydrostatic pressure can be done simultaneously by using, for example, hot water at a high temperature, preferably at a temperature above the softening point of the primary wood.

According to the second invention, a shaped ligneous material stabilized against temperature in various uses through restraining the volume relaxation is obtained by treating the densified wood with fixation means to fix the compressed state of wood.

Fixation of the compressed state is defined as a semi-permanent retention of the compressed state in terms of volume, dimension, shape, and internal structure units like tracheas, pits or cell cavities and so forth, in the compressed and temporarily stabilized ligneous material, irrespective of a change in humidity and ambient temperature imposed on a shaped ligneous material.

Conventionally, fixation of compressed state has been achieved by heating densified wood in the mold for hours, in case of a compression shaping by recourse to a mold. A combination of an upper concept regarding the fixation of compressed state and the hydrostatic forming is not known in the art. The hydrostatic compression forming of wood, as the forming method itself, is quite novel.

According to the third invention, a shaped ligneous material fixed in the compressed state in a desired shape is obtained by loading a densified wood, produced the aforesaid hydrostatic compression, in a shaping jig under the compressed condition. Next, the densified wood is relaxed slightly in its volume by reducing liquid pressure, so that the densified wood presses its surface against the inside wall of the jig. The shape of the densified wood will be defined by the shape of the jig cavity.

By this method, a shaped article, such as a column, with excellent surface hardness and high accuracy in circular cross section, or a pillar with a desired geometrical pattern on its surface, for example, can be prepared.

This method has no recourse to any mold but makes use of only a shaping jig fabricated at low cost, resulting in economizing fabrication cost of a mold and its associated apparatus, as well as running cost. Further, loading the compressed wood in the jig is much easier than loading a log in a mold in the air, as it is carried out in the pressurizing liquid. Consequently, manpower can be cut down as well.

According to the fourth invention, a shaped ligneous material fixed in the compressed state is obtained by compressing a softened wood using the aforesaid hydrostatic pressure of a pressurizing liquid, then cooling down the densified wood by lowering the liquid temperature while maintaining the liquid pressure. In the method by the fourth invention, the cooling temperature is desirable to be chosen between ambient temperature and softening point of a primary wood.

As a way of cooling, a pressurizing liquid of low temperature can be charged into the vessel used for hydrostatic compression under high pressure while discharging hot liquid to exchange the hot liquid for cold liquid in a short period of time.

According to the method of the fourth invention, a compressed state of densified wood shaped by hydrostatic compression is fixed without using any shaping jig. The shaped ligneous material obtained by this method has a decorative appearance on the whole surface, displaying furrows which are characteristics of hydrostatic compression, originating from selective compression of softer parts of the primary wood.

According to the fifth invention, a shaped ligneous material fixed in the compression state is obtained by compressing a softened wood using aforesaid hydrostatic pressure of a pressurizing liquid, then heating up the densified wood by elevating the liquid temperature while holding the liquid pressure.

Upon heating the densified wood, while keeping the liquid pressure as described above, a compressed state is presumably fixed by the effect of hydrolysis of hemicellulose and lignin contained in ligneous tissue. This results in the elimination of internal stress generated in a ligneous material during compression.

The heating temperature is desirably in the range of 140–180° C. wherein the abovementioned change takes place. The shaped ligneous material obtained by this method also has a decorative appearance on the whole surface, displaying characteristic furrows which are attributable to hydrostatic compression.

The advantage of the fifth invention is that the effect of fixation of a compressed state by heating of a densified wood is sustained permanently, on the contrary to the fact that the effect of fixation by cooling of a densified wood lasts more or less temporarily.

According to the sixth invention, a shaped ligneous material fixed in the compressed state is obtained by compressing a softened wood using the aforesaid hydrostatic pressure of a pressurizing liquid and by stabilizing the compressed state temporarily, then releasing said liquid pressure. The temporarily stabilized densified wood is then loaded in a treatment vessel and the space between the surface of densified wood and the inner wall of the vessel is filled up with heat-resistant hard particles in a state of compact-packing, and is nearly in the state of so-called "closest packing". The contents in the vessel are then heated to fix the compressed state of the wood.

In the method of the sixth invention, hard particle having the particle size in the range of 0.3–4.0 mm can be used. A small particle size is desirable for fixation of compressed state of a densified wood having fine undulations on its surface with a decorative appearance or for a fixation of a densified planks formed by compression between heated mold plates for which smooth surface is required. A particle size less than 0.3 mm is not desirable, as it is difficult to the remove particles from the decorative surface of shaped ligneous material after fixation is completed.

On the other hand, the particle size in the range of 2–3 mm is convenient in case of forming a densified log for sawing to produce sawn lumber after the densification. The particle size beyond 4 mm is not desirable, as the surface of the ligneous shaped article becomes rough and pneumatic conveyance of particles to and from the vessel becomes difficult.

In the method of sixth invention, filling up the space with particles is necessary to the extent of minimum occupation of the vacancy in the vessel or filling to the state of compact-packing by means of, for example, vibration of the vessel. At the state of compact-packing, as described above, volume relaxation of the densified wood, which is fixed temporarily, is restrained; therefore the force to expand in radial direction of wood is checked by the effect of frictional force exerted among hard particles.

By heating the whole contents in the vessel under the restrained condition, upon relaxation, the compressed state of densified wood is permanently fixed. A heating temperature in the range of 180–250° C. is used, in case of dry-heating, and 140–190° C., in case of wet-heating. Saturated steam, for example, can be used, resulting in the completion of fixation in a short time period due to very good heat transfer attributable to the heat of condensation of steam, as the heating fluid can pass through the layer of hard particles. Superheated steam also can be used, resulting in simultaneous progress of fixing of compressed state and drying of the shaped ligneous material.

Furthermore, the fixation method of this invention described above can also be applied to a densified wood formed by utilizing a mold for compression. In this case, however, the mold is used for shaping a softened wood into a densified wood with desired cross-sectional shape only for short period of time. The fixation of the compressed state, which needs many hours after compression shaping, is achieved by loading the densified wood together with heat-resistant hard particle in the vessel used in the sixth invention. Productivity per mold for a shaped ligneous material is fairly improved, as the residence time of a densified wood in the mold is remarkably shortened by this invention.

Still further, according to the seventh invention, residual stress in a primary wood, in the form of a log, lumber and the like, is eliminated by loading a primary wood together with heat-resistant hard particle in a vessel, then filling up all the space in vessel with the particle to become the state of compact-packing as mentioned above. Then the whole contents in the vessel are heated.

By the method of seventh invention, logs and lumber free from dimensional changes irrespective of changes in moisture and ambient temperature is produced conveniently and with high productivity.

Lastly, an invention utilizing a chemical means on a primary wood to make hydrostatic compression and succeeding fixation easy is described below.

According to the eighth invention, a shaped ligneous material fixed in the compressed state is obtained by treating a dried primary wood by resin impregnation using an impregnation liquid containing vinyl monomer as a principal ingredient. Next, the vinyl monomer impregnated in the wood is polymerized to produce a ligneous material containing a synthetic resin. Then the ligneous material is compressed by applying hydrostatic compression at the temperature above the softening point of primary wood, followed by cooling the compressed ligneous material while maintaining the liquid pressure.

In the method of the above-mentioned invention, the liquid containing vinyl monomer penetrates into the vacancy existing in the primary wood. It also fills any cracks on the side and end surfaces, and finally polymerizes into synthetic a resin. As the synthetic resin exists in the manner of plugging the cracks and vacancies, it can hinder the pressurizing liquid from penetrating into the wood at the time of hydrostatic compression. This is important, as hydrostatic compression becomes substantially difficult if pressurizing liquid penetrates into the primary wood through cracks on its surfaces.

In the method by the eighth invention, the monomer used is of the liquid type having an affinity for a primary wood.

A single substance or mixtures chosen from styrene, methyl methacrylate, vinyl acetate, hydrophilic acrylic monomers such as polyethylene glycol methacrylate, and glycidyl acrylate, unsaturated polyesters, and so forth, can be used in the present invention, although the invention is not limited to these examples cited above.

Further, in the method by the eighth invention, the impregnation liquid can contain, as one of the principal ingredient, at least one kind of high or medium molecular weight compound with high or medium degree of polymerization selected from high polymers, pre-polymers or oligomers, along with the aforesaid monomer. These polymers, pre-polymers and oligomes need to be soluble in the vinyl monomer and are the component which regulates the viscosity of impregnation liquid. By using the impregnation liquid containing the polymer dissolved in the vinyl monomer, the penetration of the pressurizing liquid into a primary wood can be prevented more effectively.

The shaped ligneous material obtained by the method of the eighth invention also shows fine undulations which are characteristic of the surface of shaped wood by hydrostatic compression, indicating that it can be a valuable decorative material.

It should be stressed that the shaped ligneous material obtained by the above-mentioned method shows high dimensional stability against changing humidity and ambient temperature, since the synthetic resins contained in the surface layer of the densified wood effectively prevents moisture from penetrating into the wood. In order for a densified ligneous material to undergo volume relaxation at the temperature of ordinary use, it is absolutely necessary that moisture content increases, for some reason, beyond its fiber saturation point. Thus, the eighth invention provides with a densified wood having permanently fixed compressed structure without recourse to treatment for fixing at high temperature.

In practice, all the present inventions described above are applied to soft coniferous wood, such as cedar, larch, Japanese cypress, Port Orford cedar, Douglas fir, Oregon pine, Western hemlock and the like. Basically, however the present inventions should not be restricted to particular species of wood.

DETAILED DESCRIPTION OF THE INVENTION

The invention is illustrated in more detail by reference to the following examples. However, the present embodiments are to be considered in all respects as illustrative and not restrictive. In the embodiments, unless otherwise indicated, the percentage of moisture content is by weight. The preparative recipes of impregnation liquids are by weight as well. The fundamental properties of the wood such as surface hardness and so forth were measured according to the method of Japanese Industrial Standard JIS Z 2101-1994. Further, the degree of fixation of the compressed state is indicated by the recovery ratio meaning the percentage of decrease by compression in terms of cross-sectional area or thickness in the direction of compression is recovered by relaxation, which is calculated by Equation 1 or 2.

EXAMPLE 1

Figure 1:
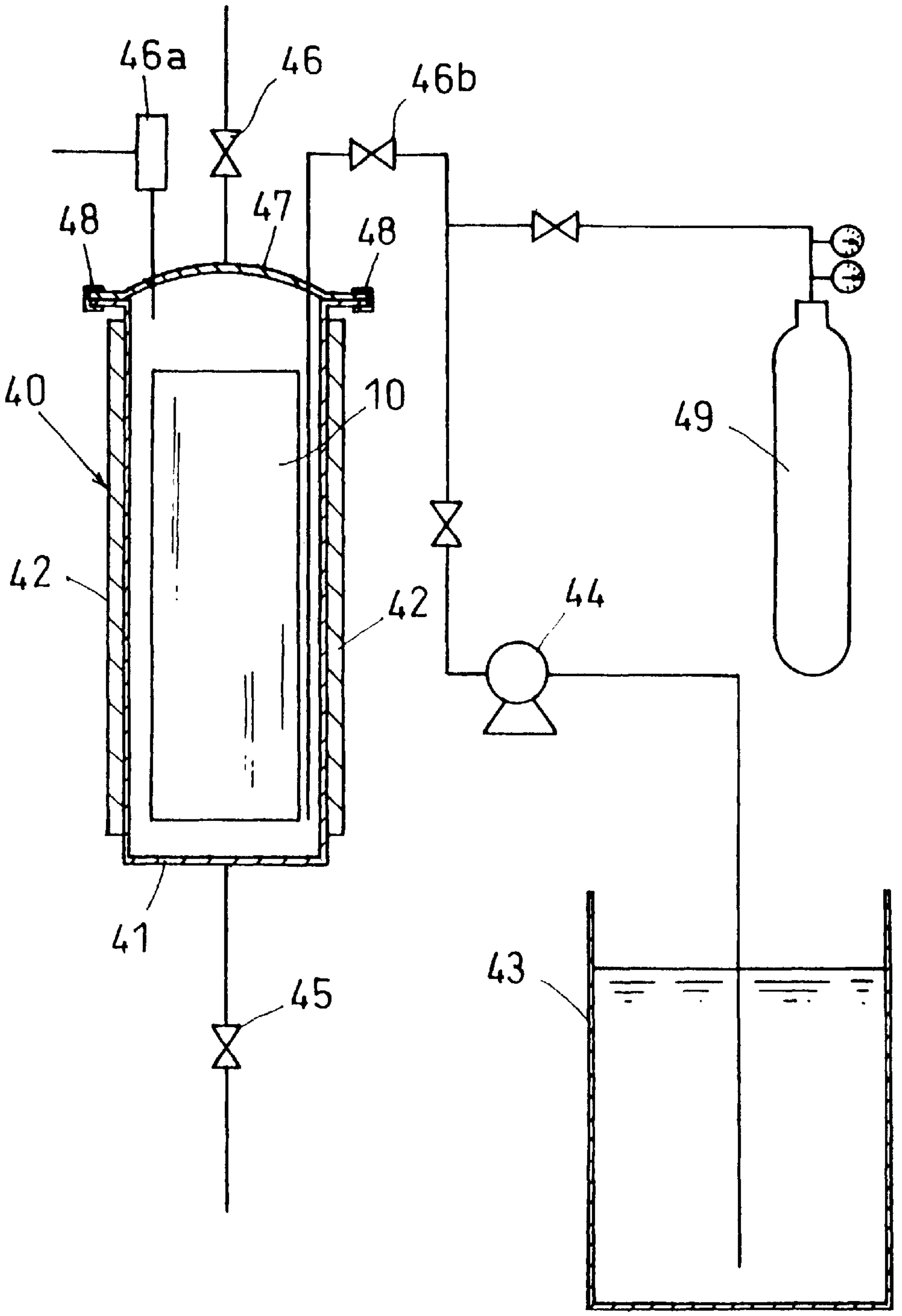
FIG. 1 is a cross-sectional figure of an example of compression forming apparatus to practice the hydrostatic compression forming of this invention.

The first invention is explained referring to FIG. 1 which shows an example of the apparatus for practicing hydrostatic compression forming. The apparatus 40 is equipped with a pressure vessel 41, a heater 42, a water tank 43 and a pump 44. A thermostat, known in relevant industry, may be equipped on the heater 42, although this is not shown in FIG. 1. Further, reference numeral 45 is for a drain valve furnished to the vessel 41, 46 is a valve for venting air or nitrogen gas to the atmosphere, 46 a for a pressure-releasing valve, 47 for a cover of the vessel, 49 for a gas cylinder containing nitrogen which can be substituted by an air compressor in certain cases, 48 for clamp furnished to the vessel for tight-sealing.

As many as 20 pieces of raw bolts of Japanese cedar with bark having a size of about 140 mm–160 mm in the diameter at the butt end and 2000 mm in the length. The average water content of the raw bolts is 120% and the bolts were treated by drying to reduce the average moisture content to 50%, in the atmosphere of steam with the pressure of 1.0 kg/cm$^2$ G at 104°C. for 3 days. Among these dried bolts, 10pieces were selected randomly to be daubed with a polychloroprene based adhesive for wood (commercial name; Bond G 17, manufactured by Konishi Co. Limited) on the both cut ends and semi-dried at about 100° C. Next, a polyvinylidene chloride film with the thickness of 20 microns, commercially used for food packaging, was glued on the layer of said adhesives, and the film at both cut ends was bound on the bolt by means of a heat-resistant rubber string.

Then, after softening these bolts by heating in an air oven at 95° C. for 3hours, the bolts were loaded in a pressure vessel 41 as shown by FIG. 1 with the inside diameter of 900 mm and the length of 3000 mm, and a cover 47 was closed. Then hot water at 95°C. was filled by using a pump 44. The hot water was pumped in for about 10minutes until the pressure reached to 25 kg/cm$^2$ G. After keeping the pressure at aforementioned level by means of a relief-valve 46 a set at 25 kg/cm$^2$ G, for 10 minutes, the pressure was released and hot water was then returned to a water tank 43, and then the bolts were cooled spontaneously to ambient temperature.

The diameter of the bolts at this stage after applying hydrostatic compression was smaller by 5% than before the treatment. The bark was partially peeled off from the ligneous part. The bolts treated as described above were loaded in a dryer working at constant temperature with the size of 2000 mm in the inside width, 2000 mm in the inside depth and 2000 mm in the inside height, respectively, then dried at 80°C. under the control on moisture of atmosphere inside at 80% until the average moisture content reached to 20%.

By observing the shaped ligneous material obtained as aforesaid, cracking by drying was noticed on the side surface of 4 pieces out of 10 bolts.

In comparison to EXAMPLE 1, the other 10 pieces of the bolts with moisture content of 50% were dried in the same dryer under the same condition as EXAMPLE 1until the average moisture content reached to 20%. Cracking after drying was observed on the surface of 9 bolts out of 10 bolts. The data indicates an advantage of hydrostatic compression forming by the first invention to improve the physical properties of wood, enabling to avoid the aforementioned karfing on drying logs by adopting the hydrostatic compression.

EXAMPLE 2

A bolt of Japanese cedar with the size of 150 mm in the diameter at the top end and 1000 mm in the length, with its bark chipped off, was wrapped with a commercial polyester film of 100 microns in the thickness, and pinholes were opened on the film. Then, the bolt was dried for 3 days in an air oven kept at 110° C., resulting in decrease in the moisture content to 37%. The bolt was taken out of the dryer to use as a primary wood for hydrostatic compression.

Both cut ends of bolt were daubed with a 20% solution of polychloroprene in methylene chloride and semi-dried, then a polyvinylidene chloride film, typically used commercially for food packaging, was glued on the both ends. Next, the film was bound on the bolt at each end by a heat-resistant rubber string.

Although the covering of cut ends with polyvinylidene chloride film is effective in preventing water from penetrating into the wood, it is not always a substantial part of the invention. The covering is necessary when higher pressure is required, as in the case where the bolts or logs are to be compressed to the heart wood. When compression is required to be limited to the peripheral part or the sap wood, the liquid pressure does not need to be too high. Treating the end surfaces with heat-resistant adhesives can be enough in such a case.

Next, the bolt was loaded in a pressure vessel 41 as shown by FIG. 1 before the temperature of bolt being raised below its softening temperature, and hot water controlled at 95° C. was pumped in. When the air inside was completely replaced by hot water, pressure-releasing valve 41 was closed. As soon as the valve 46 is closed, the inside pressure rose to 8- 10kg/cm$^2$G. The pressure stayed in the region for a while and then rose rapidly to 30 kg/cm$^2$G, and the relief-valve 46 *a* functioned to release the excess pressure, resulting in the pressure in the vessel being held constant by balancing of the discharging speed from the valve 46*a* and the pumping speed of hot water.

At this stage, if the compressed bolt were taken out of the vessel after stopping and discharging of hot water, a shaped ligneous material by the first invention will be obtained by naturally cooling and drying as described in EXAMPLE 1.

In this EXAMPLE 2, however, the pumping in of hot water was replaced by pumping in of cold water just at the time when the inside pressure reached constant pressure at 30 kg/cm$^2$ G. The temperature of discharged water was brought down to 32° C. in 15 minutes after switching of the water supply while the inside pressure being kept constant. The pumping was stopped 60 minutes after the temperature of discharged water reached 32°C. Next, the shaped ligneous material of the fourth invention was taken out of the vessel.

The resulting shaped material was compressed by 50% of its original cross-sectional area after the hydrostatic compression forming. The side surface of the shaped material was totally uneven, and irregular furrows were noticed all over the surface, showing an external appearance resembling that of a so-called “fancy log”.

The shaped material fixed in its compressed state by quenching does not bring about the volume relaxation in the ordinary environment, since the softening temperature of the material is high enough to hinder rebounding. The stability improves as the compressed wood is further dried.

EXAMPLE 3

A bolt of Japanese cedar with the size of 150 mm in the diameter at the top end and 600 mm in the length, with its bark chipped off, was dried in the same manner as in EXAMPLE 2, resulting in the moisture content of 25%. Then both cut ends of bolt were cleaned with acetone and were coated with a commercial silicone coating (Toray Dow Corning Silicone PAX 305 RTV Dispersion). Coating was repeated three times with about 1 hour intervals between coats. The coating was cured by curing at ambient temperature for 3 days.

Next, the bolt was loaded in a pressure vessel shown in FIG. 1, then the vacancy inside was filled with silicone oil. The vessel was closed with cover 47 using clamp 48, then heated to 100° C. of the inside temperature by means of metallic heater 42. Then, the vessel was pressurized to 15 kg/cm$^2$ G by injecting nitrogen gas from the cylinder 49. And then, the vessel was heated an inside temperature of 160 ° C. and maintained for 60 minutes while keeping the pressure constant. Next, the contents of the vessel were cooled down to room temperature.

The shaped ligneous material obtained as above-mentioned by the fifth invention was compressed by 52% in terms of the ratio of volume before and after the hydrostatic compression forming. The side surface of the shaped material was uneven similar to that obtained in EXAMPLE 2, and showed an external appearance resembling a “fancy log”. The surface hardness increased up to 1.5 kg/mm$^2$. Further, a test piece in the shape of a disk sawn off from the material showed only a small dimensional change when immersed in hot water of 90° C. for 20 minutes to assess the fixation of compressed state.

EXAMPLE 4

Figure 2:
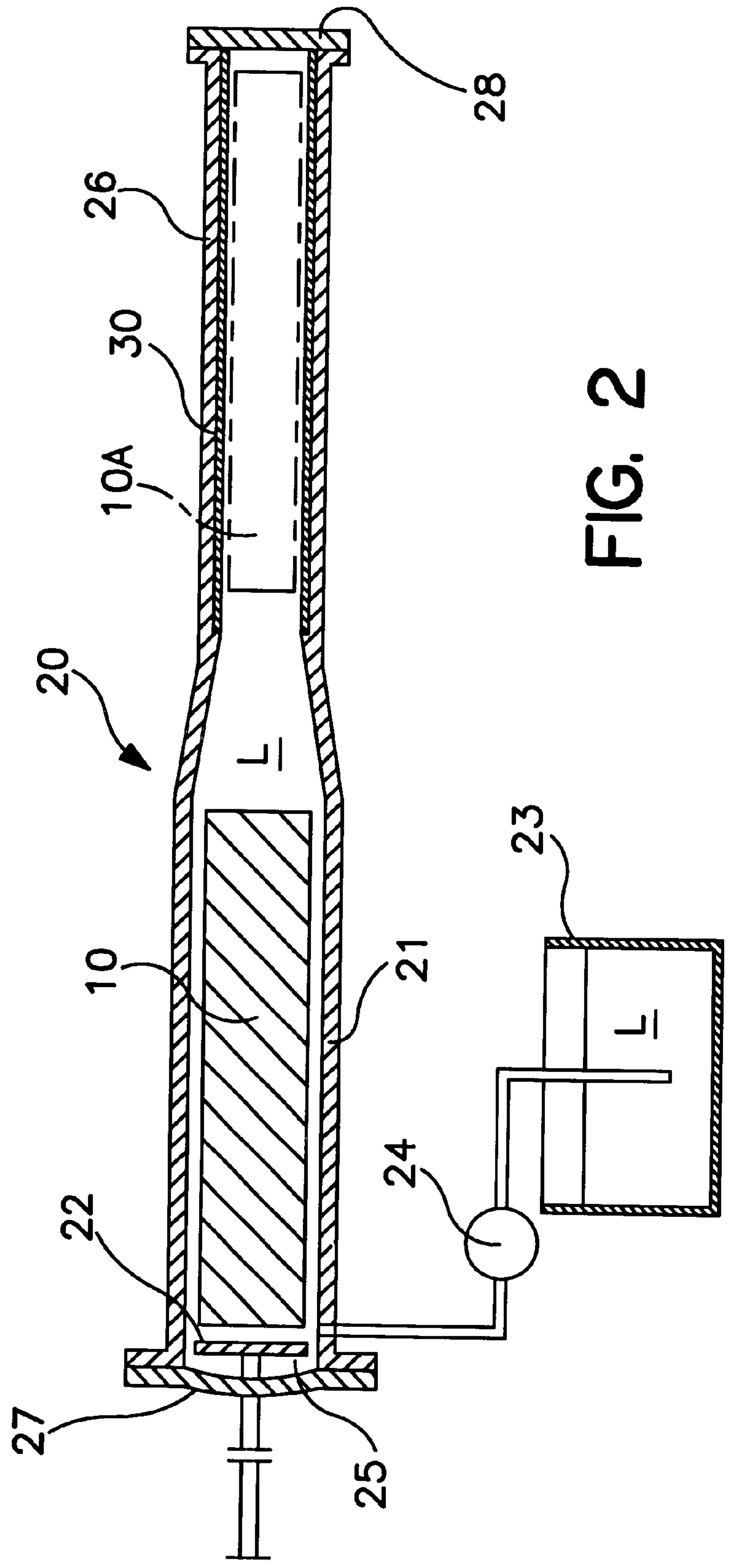
FIG. 2 is a cross-sectional figure of an example of compression forming apparatus equipped with an example of shaping jig to practice the hydrostatic compression forming of the third invention.

The third invention is explained referring to FIG. 2 which illustrates an example of the apparatus equipped with an example of a shaping jig for practicing the hydrostatic compression forming.

The apparatus 20 is equipped with a pressure vessel 21, a wood-pushing arm 22, a water tank 23 and a pump 24. The pump 24 raises the pressure of a pressurizing liquid L, in turn a primary wood 10 is compressed by the hydrostatic pressure of liquid. A shaping jig 30 is installed inside of a shaping part 26 of the apparatus 20. A compressed wood 10A is pushed into the shaping jig 30 by the wood-pushing arm 22 which is pushed from outside of the cover 27. At the cover opening 28, the compressed wood 10A, as loaded in the jig 30, is taken together out of the apparatus 20.

A bolt of Japanese cedar with bark and having a size of 150 mm in the diameter at top end, 165 mm in the diameter at the butt end, 1000 mm in the length and its moisture content being 95% was dried in the atmosphere of steam of 1 kg/cm$^2$ G at 103–105° C. for 5days, resulting in decrease in the moisture content to 40%.

The bolt was taken out of the dryer, and both ends of the bolt were daubed with the same adhesives as used in EXAMPLE 1. Next, the film and string of Example 1 were applied as well. After 2 hours of heating in an air oven controlled at 90, the bolt was loaded in the pressure vessel 21 shown in FIG. 2, then the cover 27 and 28 were closed. Next, hot water at 90° C. was pumped in the vessel by means of the pump 24 until the inside pressure raised to 25 kg/cm$^2$ G.

At this stage again, if the compressed bolt was removed from the apparatus 21, a shaped ligneous material by the first invention will be available after natural cooling and drying as described in EXAMPLE 1.

In the EXAMPLE 4, however, the compressed wood 10A was pushed into the shaping jig 30 by means of the wood-pushing arm 22 under water pressure controlled at 25 kg/cm$^2$ G. Next, the pumping was stopped to release the pressure and the hot water was drained. As the result, the compressed wood 10A was pressed against the inside wall of the shaping jig 30 due to expansion caused by partial relaxation of its volume. Then, the compressed wood 10A as loaded in the jig 30 was taken out of the apparatus 20 and dried in an air oven at 110° C. for 2days. The shaped ligneous material of the third invention was easily taken out of the jig 30, as the material shrank slightly during the drying.

The shaped ligneous material in a shape of column as obtained above has high accuracy in circular cross section, and the surface hardness was remarkably improved when compared to that of a primary wood.

An advantage of this method is that pillars with circular or polygonal cross-section can be easily produced. It should be noted that the production of similar shaped material by means of compression in molds is extremely difficult and expensive.

EXAMPLE 5

The forming method by the sixth invention is illustrated below.

Preparation of Densified Wood (No. 1)

A flat grain board of Japanese cedar with the size of 900 mm in the length, 50 mm in the thickness in radial direction, 150 mm in the width in tangential direction and with moisture content of 23%, was heated in an autoclave using saturated steam of 2 kg/cm$^2$G for 60 minutes. Then, the softened board was removed from the autoclave and compressed in radial direction between a pair of hot plates controlled at 120° C., until the board decreased in thickness to 22 mm. The hot plates were then chilled by circulating water in their cooling pipes, while maintaining the pressure, until the board temperature, at its center, reached below 30° C. A densified wood (No.1) with its compressed state temporarily fixed was obtained.

A test piece with the size of 300 mm in the length, 22 mm in the thickness in radial direction and 102 mm in the width in tangential direction was machined out of the wood (No.1). To observe transformation accurately, the measurement points were positioned in the manner of a grid having 3 points (A,B,C) placed in the tangential direction and 3 points (No.1, No.2, No.3) in the fiber direction, giving 9 points in total.

Compact Packing of Heat-resistant Hard Particles A vessel made of stainless steel was used for the heat treatment in this experiment. The vessel is of a cylindrical type with 2 end plates bolted to the cylinder through a flange. The vessel has an inside diameter of 105 mm and a length of 400 mm. It should be noted that no packing was used at the flange so that the vessel could retain hard particles inside but gases, such as steam and air, could freely flow into and out of the vessel.

The vessel, fixed with lower end plate, was placed in an upright position and alumina powder with average particle size of 0.5 mm (Morundum A-40, No.36, manufactured by Showa Denko Co. Ltd.) was put into the vessel to a depth of about 50 mm. The test piece was placed along the center line of the cylinder. The vacancy in the vessel was then filled with the alumina powder while the side wall of vessel was hammered for compact packing of the powder.

In practice at large scale, it is preferable to separate each the board from each other at a distance of a few centimeters to avoid contact. Generally, average particle size of 0.3–2 mm is desirable, in case of fixing a densified wood with smooth surface. Natural sand with relatively uniform particle size, synthetic inorganic particles, like silica and alumina, and commercial alumina abrasives can be used as well.

Filling and hammering was repeated several times until no more improvement in packing appeared to be possible. Finally, the upper end plate was bolted to the vessel in such way as to squeeze the powder inside. The side wall of the vessel was hammered again, and further bolting was done to better squeeze the contents.

As an alternative for compact packing, a vibration rod can be used to vibrate the particles by inserting the vibration rod into the particles and adding more particles.

Heat Treatment

The vessel filled as above was placed in an autoclave and heated in saturated steam at 175° C. for 1 hour. The steam pressure was then gradually reduced to atmospheric pressure and the whole was left to cool. The temperature for heating is desirable in the range of 140–190° C. in case of wet-heating by means of steaming, for example, and in the range of 180–250° C. in case of dry-heating by means of hot dry air, for example.

Figure 3:
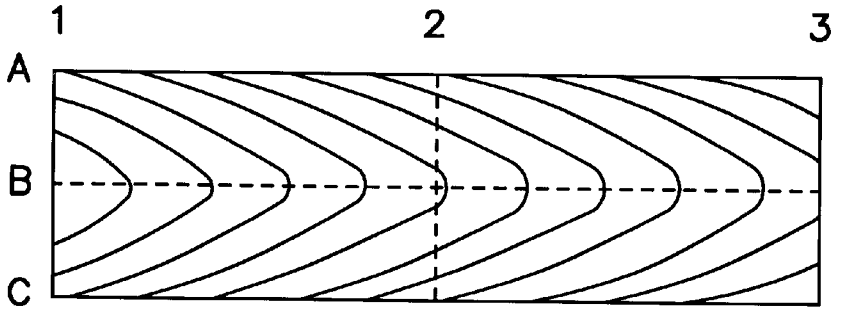
FIG. 3 is a plane figure indicating position on the ligneous shaped article (1) wherein the thickness was measured to assess the effect of the sixth invention.

The shaped ligneous material by the sixth invention, as above-mentioned, was taken out of the vessel. The material showed weight decrease of 5.8% due to loss of moisture. Next, the thickness of material was measured at the same 9 points as in FIG. 3 and the results were given in Table 1.

Measurement of the Degree of Fixation

The test piece of shaped material fixed as above was immersed in a water bath controlled at 95° C. for 60 minutes. The test piece was then dried completely by heating in an air oven at 105° C. for 3 days. The thickness of the dried test piece was measured at the same 9 points mentioned above. The percentage recovery was calculated by using the equation 1 and the results were given in Table 1.

$$\text{Percentage recovery} = \frac{t_2 - t_1}{t_0 - t_1} \times 100 \qquad \text{Equation 1}$$

$t_0$: thickness of test piece before compression $t_1$: thickness of test piece after fixation by heat treatment $t_2$: thickness of test piece after soaking and drying Tables

TABLE 1

| Position of measurement | Thickness after Compression | Fixation | Thickness increase on fixation % | Thickness after hot water soaking | Recovery ratio % |
|---|---|---|---|---|---|
| A1 | 21.6 | 21.9 | 1.4 | 21.2 | −2.5 |
| 2 | 21.9 | 22.6 | 3.2 | 22.3 | −1.1 |
| 3 | 21.7 | 22.3 | 2.8 | 22.0 | −1.1 |
| B1 | 22.5 | 22.2 | −1.3 | 22.1 | −0.3 |
| 2 | 22.4 | 22.7 | 1.3 | 22.5 | −0.7 |

TABLE 1-continued

| Position of measurement | Thickness after Compression | Fixation | Thickness increase on fixation % | Thickness after hot water soaking | Recovery ratio % |
|---|---|---|---|---|---|
| 3 | 22.2 | 21.8 | −1.8 | 21.5 | −1.1 |
| C1 | 21.9 | 21.9 | 0 | 21.3 | −2.1 |
| 2 | 21.7 | 22.5 | 3.7 | 22.0 | −1.8 |
| 3 | 21.5 | 22.5 | 4.7 | 22.0 | −1.8 |

Note:
Unit of thickness; mm
$t_0$ = 50 mm

Slightly negative values for recovery are due to complete drying of the soaked test piece, which caused an excessive shrinkage in the radial direction. This should be taken actually as proof of complete fixation of the compressed state.

EXAMPLE 6

Preparation of Densified Wood (No.2)

A bolt of Japanese cedar with bark having a size of 170 mm in diameter at the top end and 950 mm in the length, was dried in the same manner as in EXAMPLE 4 but for 2 days, resulting in decrease in the water content to 37%. Next, both cut ends were treated in the same manner as in EXAMPLE 1. The bolt was then heated in an air oven at 90° C. for 2 hours.

Next, the bolt was placed in a pressure vessel of vertical cylinder type shown in FIG. 2. The vessel was filled with hot water of 95° C. On closing the lid, cold water was pumped into the vessel from the bottom at the rate of 2 liters per minutes. The inside pressure reached 30 kg/cm$^2$ G in 5 minutes. Then, cold water was continuously supplied while the pressure was retained by means of the relief- valve until the drain temperature reached to 30° C., which took about 15 minutes. Pumping of cold water was continued for another 90 minutes before compressed bolt was removed.

After removing the bark, the bolt was left in a dry environment for a week. The densified wood (No.2) obtained had the characteristic appearance resembling a “fancy log”. The cross sections of densified wood(No.2) was photo-copied on paper to measure the area. By the measurement, average decrease in the area by 48% was observed due to the compression.

Fixation by Heat Treatment

The densified wood(No.2) was split along the fiber direction and the split surface of the resulting piece was finished with a plane. By sawing the piece at a right angle to the fiber direction, a test piece of 220 mm in the length was prepared. The cross section of the test piece is shown in FIG. 4(*a*), wherein the letter A marked on the section means it is the butt end.

Next, the test piece was treated in the same way as described in EXAMPLE 5 by using the same vessel, alumina and autoclave as described in EXAMPLE 5 to obtain the shaped ligneous material by the sixth invention.

Generally, the average particle size of 2–4 mm is desirable in case of fixing a log for producing sawn lumber.

Figure 4A:
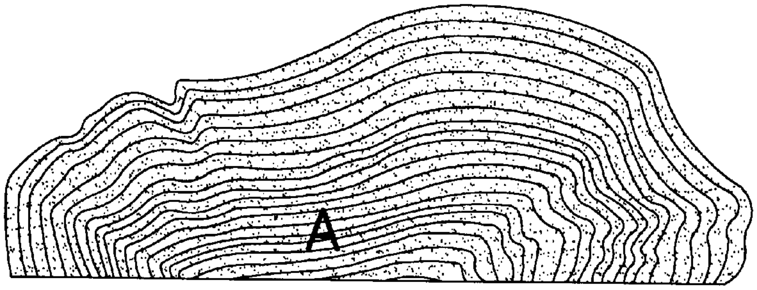
FIG. 4 shows a cross-section of the butt end of the ligneous shaped article to exhibit the effect of the sixth invention. Figure(a) and (b) show the cross-section before and after the fixation of the compression state, respectively.
Figure 4B:
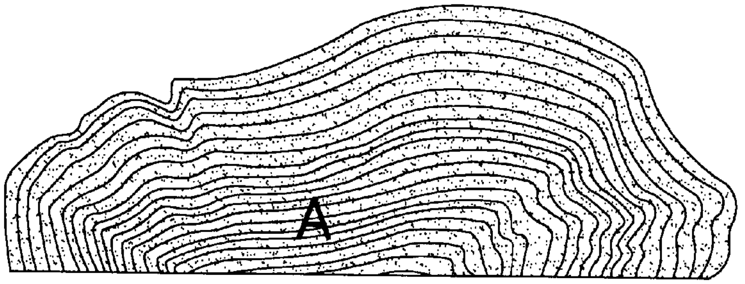
Figure 5:
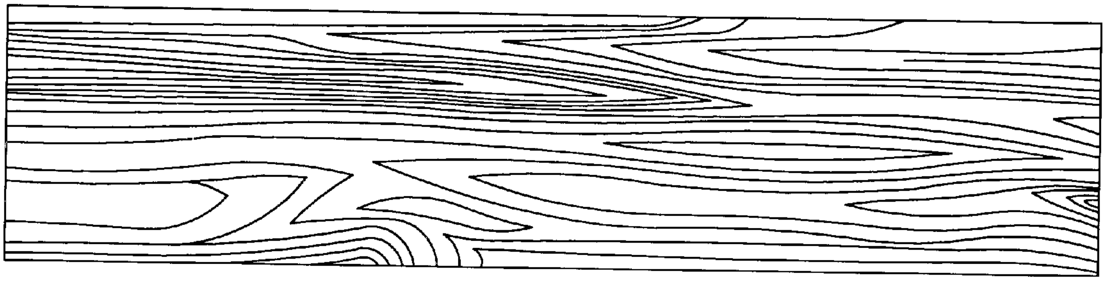
FIG. 5 is a plane figure of grain on the surface of a plank sawn out from a decorative shaped ligneous material obtained by the eighth invention.

The butt end after the heat treatment was photo-copied to measure the cross-sectional area. A comparison between FIG. 4(A) and 4(B) shows that details of the section profile are retained except that there is a decrease in the area of 1.6% which occurred due to the treatment. It was shown that no volume relaxation or expansion of test piece took place during the course of fixation by steam heating. A decrease in the weight by 5.4% was observed in the treatment.

Measurement of the Degree of Fixation

The test piece was treated in the same condition as described in EXAMPLE 5 by using the hot water bath and the oven. The measurement of the cross section showed no change in the area through the treatment. That is, the percentage recovery calculated by the equation 2 has turned out to be zero.

$$\text{Percentage recovery} = \frac{s_2 - s_1}{s_0 - s_1} \times 100 \qquad \text{Equation 2}$$

$s_0$: cross-sectional area of test piece before compression $s_1$: cross-sectional area of test piece after compression and fixation $S_2$: cross-sectional area of test piece after soaking and drying By applying the above mentioned method to a log, a sawn lumber and the like, as a primary wood in replacement of a compressed wood, a residual stress existing in logs and sawn lumber can be removed. In case of this seventh invention, the temperature of heat treatment corresponding to fixation treatment is desirably in the range of 70–150° C.

EXAMPLE 7

The forming method by the eighth invention is illustrated below.

Driving of a Primary Wood

Two pieces of a log with the length of 800 mm were cut out from Japanese cedar with bark, with the size of 150 mm in the diameter and 1800 mm in the length, are use as a primary wood in hydrostatic compression and as a control, respectively. The primary wood was dried in the atmosphere of steam of 1 kg/cm$^2$ G at 105° C. for 3 days. After drying, the bark was removed by means of a metal scraper. Cracking by drying with maximum width of around 1 mm and radially directed was observed at the heart part of both ends, as well as small cracks in the fiber direction on the side surface. The moisture content was calculated to be 29% by using the decrease in weight after drying. The weight after drying was 7.34 kg.

Generally, it is desirable to dry the wood to approximately to the fiber saturation point (moisture content of about 28%) to make impregnation easy, though excessive drying below that point is not desirable due to frequent generation of surface cracks.

Preparation of Impregnation Liquid

A dope of polymethyl methacrylate for impregnation was prepared by dissolving 30 parts of polymethyl methacrylate of a commercial grade into 100 parts of commercially available methyl methacrylate of extra pure grade. After cooling the solution, 2 parts of benzoyl peroxide were added. Further, 0.2 parts of N,N-dimethyl aniline was added to the solution as a promoter for polymerization just before using the dope.

Generally, the volume of polymer to be dissolved in a dope can be adjusted to make viscosity of the dope suitable for filling the cracks generated on a primary wood. The impregnation liquid can contain any wood preservatives as long as they are soluble in the liquid.

Resin Impregnation

The dried log mentioned above was loaded in the pressure vessel of vertical type with the inside diameter of 200 mm. Next, the dope was poured in the vessel up to 1000 mm in the depth. The log, with buoyancy, was submerged into the dope by using a weight. Then, the vessel was tightly sealed and the inside pressure was lowered by a vacuum pump to 50 mm Hg and kept at this level for 5 minutes.

Next, nitrogen was injected from a gas cylinder to impregnate the dope by pressurizing for 10 minutes. The vessel was opened to recover the dope and the log was removed and wiped-off to remove the extra dope on its surface. The polymerization of methyl methacrylate in the impregnated dope was completed by heating the log in the atmosphere of nitrogen at 30° C. for 1 hour and at 90° C. for another 1 hour, successively. Total weight of log after impregnation was 7.92 kg. Nitrogen can be replaced by air in case of the monomer in the dope is polymerizable in the presence of oxygen or moisture in the air.

Hydrostatic Compression

The log, after treatment, was loaded in an autoclave of the vertical type filled with hot water at 95° C., Then the autoclave was tightly sealed and heated at 95° C. for 30 minutes. After the heating, the valve at bottom of the autoclave was opened to inject cold water at 15° C. by means of a pump. The log was compressed by the hydrostatic pressure at 26 kg/cm$^2$ G in the same manner as in EXAMPLE 2, and in consequence, the temperature of water was brought down to 30° C. in 15 minutes. The operation continued for another 60 minutes. Then, the shaped ligneous material by the eighth invention was removed from the autoclave.

The cross-sectional area at both ends of log was reduced to 57% in the average by compression. The side surface of the log had uneven and external appearance like a “fancy log”. Penetration of water during the hydrostatic compression was concluded to be minimal, as the total weight of the shaped material was 7.95 kg.

Test for Physical Properties

A 20 mm thick board was prepared from the above-mentioned log by sawing and planing. A non-natural beautiful grain appeared on the surface of the board reflecting the internal deformation of annual rings by the hydrostatic compression. Table 2 summarizes the results of the measurement on flexural strength and other physical properties conducted on the test piece with the dimension of 20 mm in the width in tangential direction, 20 mm in the thickness in radial direction and 320 mm in the length in fiber direction cut out of the above-mentioned board. The hardness and abrasion data are shown also in the table. It was concluded that the shaped ligneous material obtained by the eighth invention as mentioned above was superior to a dried primary wood in all of the fundamental properties.

TABLE 2

| Fundamental properties | Shaped material of this invention | Dried primary wood for comparison |
|---|---|---|
| Dried specific gravity | 0.71 | 0.40 |
| Flexural strength (N/mm$^2$) | 99 | 78 |
| Flexural modulus (N/mm$^2$) | 12300 | 7800 |
| Surface hardness (kgf/mm$^2$) | 1.26 | 1.05 |
| Abrasion loss (mm) | 0.17 | 0.36 |

The present invention may be embodied in other specific forms without departing from the spirit or essential characteristics thereof. The scope of the invention is to be indicated by the appended claims rather than by the foregoing description and all changes which come within the meaning and range of equivalency of the claims are therefore intended to be embraced therein.

The entire disclosure of Japanese Patent Application No. 8-283181 filed on Oct. 4, 1996 and Japanese Patent Application No. 9-60365 filed on Mar. 14, 1997 and Japanese Patent Application No. 9-106027 filed on Apr. 23, 1997, including specification, claims, drawings and summary are incorporated herein by reference in its entirety.

What is claimed is:

1. A method for method for producing a fancy log with a decorative and complicated external appearance from a primary wood in the shape of a log, without utilizing a mold, wherein said primary wood is compressed to a desired compression ratio of about 50% by cross-sectional ratio and said primary wood is selected from the group consisting of cedar, larch, Japanese cypress, Port Orford cedar, Douglas fir, Oregon pine, and Western hemlock, said method comprising a) softening said primary wood, in the shape of a log, having a water content between 10 and 80% by weight by heating said primary wood to a temperature above a softening temperature of said primary wood of about 100° C. to form a softened primary wood, and b) compressing said softened primary wood, in the shape of a log, using hydrostatic pressure in the range of about 12 kgf/cm$^2$ G to about 30 kgf/cm$^2$ G to form said decorative and complicated external appearance and a compressed primary wood having a compressed state with a higher density and hardness than said primary wood, wherein the hydrostatic pressure is produced from a pressurized liquid having a temperature of about 100° C.

2. The method according to claim 1, wherein said softening a) and said compressing b) are conducted concurrently by using said pressurized liquid.

3. A method for producing a fancy log with a decorative and complicated external appearance from a primary wood, in the shape of a log, without utilizing a mold, wherein said primary wood is compressed to a desired compression ratio of about 50% by cross-sectional ratio and said primary wood is selected from the group consisting of cedar, larch, Japanese cypress, Port Orford cedar, Douglas fir, Oregon pine, and Western hemlock, said method comprising a) softening said primary wood, in the shape of a log, having a water content between 10 and 80% by weight by heating said primary wood to a temperature above a softening temperature of said primary wood of about 100° C. to form a softened primary wood;

b) compressing said softened primary wood, in the shade of a log, using hydrostatic pressure in the range of about 12 kgf/cm$^2$ G to about 30 kgf/cm$^2$ G to form said decorative and complicated external appearance and a compressed primary wood having a compressed state with a higher density and hardness than said primary wood, wherein the hydrostatic pressure is produced from a pressurized liquid having a temperature of about 100° C. ; and c) treating said compressed Primary wood under a pressure at least equal to said pressure of said compressing b) with at least one means for fixing said compressed state of said compressed primary wood to form said fancy log.

4. The method according to claim 3, wherein said softening a) and said compressing b) are conducted concurrently by using said pressurized liquid.

5. The method according to claim 3 or 4, wherein said treating c) with said means for fixing includes:

(1) loading said compressed primary wood in a shaping jig placed under hydrostatic pressure, (2) reducing said hydrostatic pressure for allowing said compressed primary wood to relax its compressed volume and to press its surface against an inside wall of said jig for shaping said compressed primary wood, and then (3) holding said shaped compressed Primary wood in said jig for fixing said relaxed compressed volume of said shaped compressed primary wood to form said fancy log.

6. The method according to claim 3 or 4, wherein said treating (c) with said means for fixing includes elevating said temperature of said Pressurized liquid to a temperature in the range of 140–180° C. while said hydrostatic pressure of said pressurized liquid is maintained at the level used in said compressing b).

7. The method according to claim 3 or 4, wherein said treating (c) with said means for fixing includes:

(1) loading said compressed primary wood in a vessel, (2) filling up all space left inside said vessel with heat-resistant hard particles in a state of compact-packing, and (3) heating the contents of said vessel while retaining said state of compact-packing for fixing said compressed state of said compressed primary wood to form said fancy log.

8. The method according to claim 7 wherein said heating while retaining the state of compact-packing is carried out either by dry-heating in the range of 180–250 ° C. or by wet-heating in the range of 140–190 ° C.

9. The method according to claim 7, wherein said (b) step for compressing is conducted by means of either a shaping jig or a mold.

10. The method according to claim 7, wherein a particle size of said heat-resistant hard particles is in the range of 0.3–4 mm.

11. The method according to claim 10, wherein said heating while retaining the state of compact-packing is carried out either by dry-heating in the range of 180–250° C. or by wet-heating in the range of 140–190° C.

12. The method according to 7, wherein said filling with said heat-resistant hard particles in said state of compact-packing is conducted by vibration.

13. The method according to claim 12, wherein said heating while retaining the state of compact-packing is carried out either by dry-heating in the range of 180 –250° C. or by wet-heating in the range of 140 –190° C.

14. The method of claim 3, wherein said treating c) with said means for fixing consists of lowering a temperature of said compressed primary wood below said softening point temperature of said compressed primary wood below said softening point temperature of said primary wood within one hour while said hydrostatic pressure of said pressurized liquid is maintained at the level used in said compressing b).

15. The method according to claim 14, wherein said softening a) and said compressing b) are conducted concurrently by using said pressurized liquid.

16. The method of claim 14, wherein said treating c) with said means for fixing is conducted by exchanging said pressurized liquid having a temperature of about 100° C. with a second pressurized liquid having a temperature lower than said temperature of said Ppessurized liquid so that a temperature of said compressed primary wood is brought down below said softening point of said primary wood within one hour while said hydrostatic pressure is maintained at the level used in said compressing b).

17. A hydrostatic compression method for producing a fancy log with a decorative and complicated external appearance from a dried primary wood, in the shape of a log, without utilizing a mold, wherein said primary wood is compressed to a desired compression ratio of about 50% by cross-sectional ratio and said primary wood is selected from the group consisting of cedar, larch, Japanese cypress, Port Orford cedar, Douglas fir, Oregon pine, and Western hemlock, comprising:

(a) impregnating said primary wood, in the shape of a log, with a liquid containing at least one kind of vinyl monomer as a principal ingredient, (b) polymerizing said vinyl monomer impregnated in said primary wood for producing a ligneous material, in the shape of a log, containing synthetic resin in said primary wood, (c) compressing said ligneous material, in the shape of a log, using hydrostatic pressure in the range of about 12 $kgf/cm^2$ G to about 30 $kgf/cm^2$ G to form said decorative and complicated external appearance and a compressed ligneous material having a compressed state with a higher density and hardness than said primary wood, wherein the hydrostatic pressure is produced from a pressurized liquid having a temperature above a softening point of said primary wood of about 100° C., and (d) cooling down said compressed ligneous material below said softening point of said primary wood while said hydrostatic pressure of said pressurized liquid is maintained at the level used in said compressing c) for fixing said compressed state of said compressed ligneous material to form said fancy log.

18. The method according to claim 17, wherein said liquid used in said impregnating a) contains vinyl monomer and at least one compound selected from the group consisting of polymer, pre-polymer and origomer of said vinyl monomer.

19. A method for producing a fancy log with a decorative and complicated external appearance from a primary wood, in the shape of a log, without utilizing a mold, wherein said primary wood is compressed to a desired compression ratio of about 50% by cross-sectional ratio and said primary wood is selected from the group consisting of cedar, larch, Japanese cypress, Port Orford cedar, Douglas fir, Oregon pine, and Western hemlock, said method comprising a) adjusting a water content of said primary wood, in the shape of a log, to provide an adjusted water content in the range of 10–80% by weight;

b) bringing said primary wood, in the shape of a log, having said adjusted water content into a softened state by heating said primary wood having said adjusted water content to a temperature above a softening point of said primary wood having said adjusted water content;

c) compressing said primary wood, in the shape of a log, in said softened state by using hydrostatic pressure wherein said hydrostatic pressure is applied by a liquid as a pressurizing medium to form said decorative and complicated external appearance and a compressed primary wood having a compressed state with a higher density and hardness than said primary wood; and d) lowering a temperature of said liquid below said softening point of said primary wood having said adjusted water content while said hydrostatic pressure of said compressing c) is maintained to fix said compressed state of said compressed primary wood to thereby form said fancy log.

* * * * *